US007681549B2

(12) United States Patent
Huettlin (10) Patent No.: US 7,681,549 B2
(45) Date of Patent: Mar. 23, 2010

(54) OSCILLATING PISTON ENGINE

(76) Inventor: Herbert Huettlin, Daimlerstrasse 7, Steinen (DE) 79585

( * ) Notice: Subject to any disclaimer, the term of this patent is extended or adjusted under 35 U.S.C. 154(b) by 0 days.

(21) Appl. No.: 12/139,879

(22) Filed: Jun. 16, 2008

(65) Prior Publication Data
US 2008/0245345 A1    Oct. 9, 2008

Related U.S. Application Data

(63) Continuation of application No. PCT/EP2006/012093, filed on Dec. 15, 2006.

(30) Foreign Application Priority Data

Dec. 16, 2006    (DE)    ........................ 10 2005 062 529

(51) Int. Cl.
*F02B 53/00*    (2006.01)
*F01C 1/00*    (2006.01)
*F04C 18/00*    (2006.01)
*F04C 2/00*    (2006.01)

(52) U.S. Cl. .................... 123/241; 123/245; 123/18 R; 418/36; 418/37

(58) Field of Classification Search ................ 123/241, 123/245, 18 R; 418/35–38, 68; 180/65.1, 180/65.3
See application file for complete search history.

(56) References Cited

U.S. PATENT DOCUMENTS

| 3,552,363 | A | * | 1/1971 | Funakoshi | .................... | 418/36 |
| 3,739,755 | A | * | 6/1973 | Folstadt | ........................ | 418/36 |
| 5,988,307 | A | | 11/1999 | Yamada et al. | ............. | 180/65.3 |
| 6,698,395 | B1 | * | 3/2004 | Vasilantone | .................. | 123/243 |
| 7,469,673 | B2 | * | 12/2008 | Wagner | ...................... | 123/241 |
| 2005/0008515 | A1 | | 1/2005 | Huttlin | ........................ | 417/481 |

(Continued)

FOREIGN PATENT DOCUMENTS

DE       4124479 A1      1/1993

(Continued)

OTHER PUBLICATIONS

A fully certified English translation of RU 2 237 817 C1.*

(Continued)

*Primary Examiner*—Thai Ba Trieu
(74) *Attorney, Agent, or Firm*—St. Onge Steward Johnston & Reens LLC (57) ABSTRACT

An oscillating piston engine comprises an internal combustion engine part having a housing part in which there are arranged a first and at least a second piston which can jointly revolve in the housing part about an axis of rotation fixed in relation to the housing and which, when revolving about the axis of rotation, perform reciprocating oscillating movements in opposition to one another an axis of oscillation extending perpendicularly to the axis of rotation. The first piston has a first end face and the at least second piston has a second end face facing the first end face, the end faces delimiting a working chamber in the direction of oscillation of the pistons. The internal combustion engine part is adjoined in the direction of the axis of rotation by an electromotive part having at least one rotor which is arranged concentrically with the axis of rotation and which is arranged in a housing part adjoining the housing part of the internal combustion engine part.

17 Claims, 2 Drawing Sheets

U.S. PATENT DOCUMENTS

| | | |
|---|---|---|
| 2005/0135950 A1 | 6/2005 | Huettlin .................... 418/35 |
| 2005/0224263 A1 | 10/2005 | Vasilantone ............... 180/65.1 |
| 2009/0038581 A1* | 2/2009 | Huettlin .................... 123/18 R |
| 2009/0084345 A1* | 4/2009 | Yim .......................... 123/241 |

FOREIGN PATENT DOCUMENTS

| | | |
|---|---|---|
| FR | 2322282 A | 3/1977 |
| RU | 2237817 C1 | 10/2004 |
| WO | 03067033 A1 | 8/2003 |

OTHER PUBLICATIONS

International Search Report, Mar. 21, 2007, 6 pages.
International Preliminary Report on Patentability and Translation of the Written Opinion of the International Searching Authority, Jul. 8, 2008, 7 pages.

* cited by examiner

OSCILLATING PISTON ENGINE

CROSS REFERENCE TO RELATED APPLICATIONS

The present application is a continuation of pending international patent application PCT/EP2006/012093 filed on Dec. 15, 2006 which designates the United States, and which claims priority of German patent application No. 10 2005 062 529.0 filed on Dec. 16, 2005.

BACKGROUND OF THE INVENTION

The invention generally relates to oscillating piston engines. More specifically, the invention relates to oscillating piston engines having at least two pistons which can jointly revolve in a housing about an axis of rotation fixed in relation to the housing and which, when revolving about the axis of rotation, perform reciprocating oscillating movements in opposition to one another about an axis of rotation extending perpendicularly to the axis of rotation.

An oscillating piston engine of this type is known from document WO 03/067033 A1.

Oscillating piston engines, and in particular an oscillating piston engine according to the present invention, can be used as internal combustion engines. An oscillating piston engine according to the present invention is preferably used as a drive motor for a motor vehicle.

If the oscillating piston engine is used as an internal combustion engine, the individual working strokes of admitting, compressing, igniting the combustion mixture and expanding and expelling the burnt combustion mixture are conveyed by reciprocating oscillating movements of the individual pistons between two end positions and by the corresponding periodic change in the volume of the working chamber.

Also known are so-called hybrid drives. A hybrid drive is usually a combination of an internal combustion engine and an electric engine. Hybrid drives of this type, which are nowadays becoming increasingly important, have the advantage of allowing, for example when driving through towns, the pollutant-free electric drive to be utilized, whereas when driving in the country and on motorways, the internal combustion engine is utilized.

The known hybrid drives are however based on internal combustion engines configured as reciprocating piston engines comprising linearly movable pistons, the pistons being arranged for example in series or in a V-shaped configuration. In combination with an electromotive part, a known hybrid drive of this type is very bulky and heavy.

SUMMARY OF THE INVENTION

The invention is based on the object of developing an oscillating piston engine of the type mentioned at the outset in such a way that it also allows the advantages of a hybrid drive to be utilized without the occurrence of the drawbacks of known hybrid drives with regard to overall size and overall weight.

According to an aspect of the invention, an oscillating piston engine is provided, comprising an internal combustion engine part having a first housing part
  a first and at least a second piston arranged in the first housing part and being able to jointly revolve in the first housing part about an axis of rotation fixed in relation to the first housing part, and further being able, when revolving about the axis of rotation, to perform reciprocating oscillating movements in opposition to one another about an axis of oscillation extending perpendicularly to the axis of rotation,
  the first piston having a first end face and the at least second piston having a second end face facing the first end face, the first and second end faces delimiting a working chamber in direction of oscillation of the pistons,
an electromotive part adjoining the internal combustion engine part in direction of the axis of rotation, the electromotive part having
  a second housing part adjoining the first housing part of the internal combustion engine part,
  at least one rotor arranged in the second housing part concentrically with the axis of rotation.

The oscillating piston engine according to the invention thus provides a hybrid drive which, in contrast to the known hybrid drives, takes up much less overall space, because the at least two pistons and the at least one rotor of the electromotive part revolve about the same axis of rotation, thus allowing the internal combustion engine part comprising the at least two pistons and the electromotive part comprising the at least one rotor to be accommodated in a compact housing composed of the two housing parts of the internal combustion engine part and the electromotive part. The "open sides" of the two housing parts can preferably be flanged directly to one another. In the conventional hybrid drives, the combustion engine part of which has a reciprocating piston engine comprising linearly movable pistons, such compact arrangement of the two drive parts is, on the other hand, not possible, because the linear piston movement and the rotating movement of the electromotive part require fundamentally different housing geometries.

The oscillating piston engine according to the invention allows environmentally-friendly use in that the drive is produced, for example when driving through towns, by the electromotive part and, when driving in the country or on motorways, by the internal combustion engine part.

In a preferred configuration, the housing of the internal combustion engine part is substantially hemispherical and the housing of the electromotive part substantially cylindrical in its configuration.

This measure leads to a particularly compact design of the oscillating piston engine according to the invention, as a hemi-spherical housing is optimally adapted to the internal combustion engine part of the oscillating piston engine, whereas a cylindrical configuration of the housing of the electromotive part is optimally adapted to the electromotive part.

In a further preferred configuration, the pistons are arranged with respect to the axis of rotation in such a way that the axis of rotation extends through the working chamber.

This measure ensures an advantageous development of the known oscillating piston engine according to WO 03/067033 A1, in which the working chamber is arranged outside the axis of rotation, i.e. the two pistons of the known oscillating piston engine are in their TDC position, in which the volume of the working chamber is minimal, perpendicular to the axis of rotation. On the other hand, the above-mentioned measure has the advantage of reducing, owing to the shorter distance of the pistons from the axis of rotation, the centrifugal forces which act on the pistons during revolution about the axis of rotation and also act in the direction of the swivelling-apart of the two pistons, i.e. the centrifugal forces support the working stroke of the expansion.

In a further preferred configuration, a shaft, which is rotatably fixedly connected to the first and at least second piston and around which the rotor of the electromotive part is arranged, is arranged concentrically with the axis of rotation.

This measure likewise advantageously contributes to a particularly compact design of the oscillating piston engine according to the invention as a hybrid drive, as the shaft, which is rotatably fixedly connected to the first and at least second piston, at the same time takes over the shaft or the bearing of the rotor of the electromotive part. Separate mounting of the rotor of the electromotive part is thus not required, as a result of which not only is a compact design achieved but rather the number of parts of the oscillating piston engine according to the invention is also kept low.

In this connection, it is furthermore preferred if the electromotive part has at least one electric motor/generator, the rotor of which is connected to the shaft via a free wheel, so that the rotor can revolve about the axis of rotation even when the shaft is stationary.

This measure affords the advantage of allowing the oscillating piston engine according to the invention also to operate exclusively as an electric drive, i.e. without the internal combustion engine part being in operation. If the oscillating piston engine according to the invention is used in a motor vehicle, the motor vehicle can, if the electric motor is designed accordingly, be driven, for example when driving through towns, merely by the electric motor.

In a further preferred configuration, a drive/output shaft, which is connected to the rotor of the electromotive part via a transmission arrangement, is arranged parallel to and set apart from the axis of rotation.

The transmission arrangement can, for example, consist of a gear-wheel arrangement in that teeth are provided on the rotor of the electromotive part and corresponding teeth or a gear wheel are provided on the drive/output shaft, so that the teeth of the drive/output shaft mesh with the corresponding teeth of the rotor of the electromotive part. Instead of a gear-wheel arrangement, the transmission arrangement can also have a profiled tooth/belt drive or the like.

The arrangement of the drive/output shaft parallel to and set apart from the axis of rotation has the advantage that the drive/output shaft does not collide with parts of the internal combustion engine part such as inlet and outlet ports and also ignition plugs, injection nozzles and the like, thus allowing these parts advantageously to be arranged on the end side of the internal combustion engine part in the extension of the axis of rotation.

In a further preferred configuration, the drive/output shaft is operatively connected via a further transmission arrangement to the shaft, to which the pistons are rotatably fixedly connected, and via a clutch which can be switched over between free-wheeling and force-locked connection.

This facilitates, at low design costs, further modes of operation, i.e., when the internal combustion engine part is running, switching the clutch to force-locked connection allows the electromotive part to be driven at the same time to generate power via the electric motor/generator, for example to feed electric units or to charge the vehicle battery. The clutch is switched to free-wheeling if only the electromotive drive is to be utilized without the internal combustion engine part being in operation.

In a further preferred configuration, the electromotive part has a starter/generator.

The starter/generator is preferably provided, in addition to the above-mentioned electric motor/generator, in the electromotive part of the oscillating piston engine and, according to a further preferred configuration, the rotor of the starter/generator is rotatably fixedly connected to the shaft to which the pistons are rotatably fixedly connected.

For starting the internal combustion engine part of the oscillating piston engine according to the invention, voltage is applied to the starter/generator which actuates the internal combustion engine part of the oscillating piston engine via the shaft which is thus set in rotation about the axis of rotation. As soon as the internal combustion engine is then in operation, the starter/generator is permanently driven, while the internal combustion engine part is running, via the shaft as a generator for generating power.

In a further preferred configuration, the internal combustion engine part has at least a third and fourth pivotable pistons which can revolve about the axis of rotation and form a second working chamber.

This measure has the advantage that the internal combustion engine part can provide higher overall power than if only two pistons are provided.

It is in this case preferred if the at least third and fourth pistons are arranged in the direction of the axis of rotation on a side of the electromotive part that opposes the first and second piston and are pivotable about a second axis of oscillation.

In this configuration, the electromotive part is thus sandwiched between the two pairs of pistons of the internal combustion engine part, allowing overall a particularly compact design.

Preferably, the at least third and fourth pistons are arranged in a hemispherical housing part.

The housing as a whole of the oscillating piston engine according to the invention thus preferably has in this configuration three housing parts which on the end side are hemispherical and in the central region cylindrical in their configuration. This leads, compared to the oscillating piston engine according to WO 03/067033 A1, which has an overall spherical housing, to a design which is just slightly larger and has the advantage that the oscillating piston engine is configured in a compact manner with an electromotive part as the hybrid drive.

In a further preferred configuration, the first and second and the at least third and fourth pistons are mounted in a piston cage having in a central region the shaft.

This configuration leads furthermore to a configuration, requiring few parts, of the oscillating piston engine as a hybrid drive, as the piston cage rotatably fixedly receives at its two ends the pistons in corresponding holes with respect to the axis of rotation and has at its centre the shaft (system shaft) which also carries the electromotive part.

In a further preferred configuration, the shaft has a separable clutch so that, when the clutch is separated, the at least third and fourth piston do not revolve about the axis of rotation, whereas the first and second piston revolves about the axis of rotation.

This measure affords the further advantage of allowing the internal combustion engine part selectively to be operated as a two-piston engine or as a four-piston engine.

Overall, the oscillating piston engine according to the invention provides, while taking up as little space as possible, what is known as a full hybrid which allows, compared to conventional hybrids, not only space to be saved but also weight to be saved.

Further advantages and features will become apparent from the subsequent description and the appended drawings.

It will be understood that the features which have been mentioned hereinbefore and will be described hereinafter can be used not only in the respectively specified combination but rather also in other combinations or in isolation without departing from the scope of the present invention.

BRIEF DESCRIPTION OF THE DRAWINGS

An exemplary embodiment of the invention is illustrated in the drawings and will be described hereinafter in greater detail with reference to the drawings, in which.

DETAILED DESCRIPTION OF A PREFERRED EXEMPLARY EMBODIMENT

Figure 1:
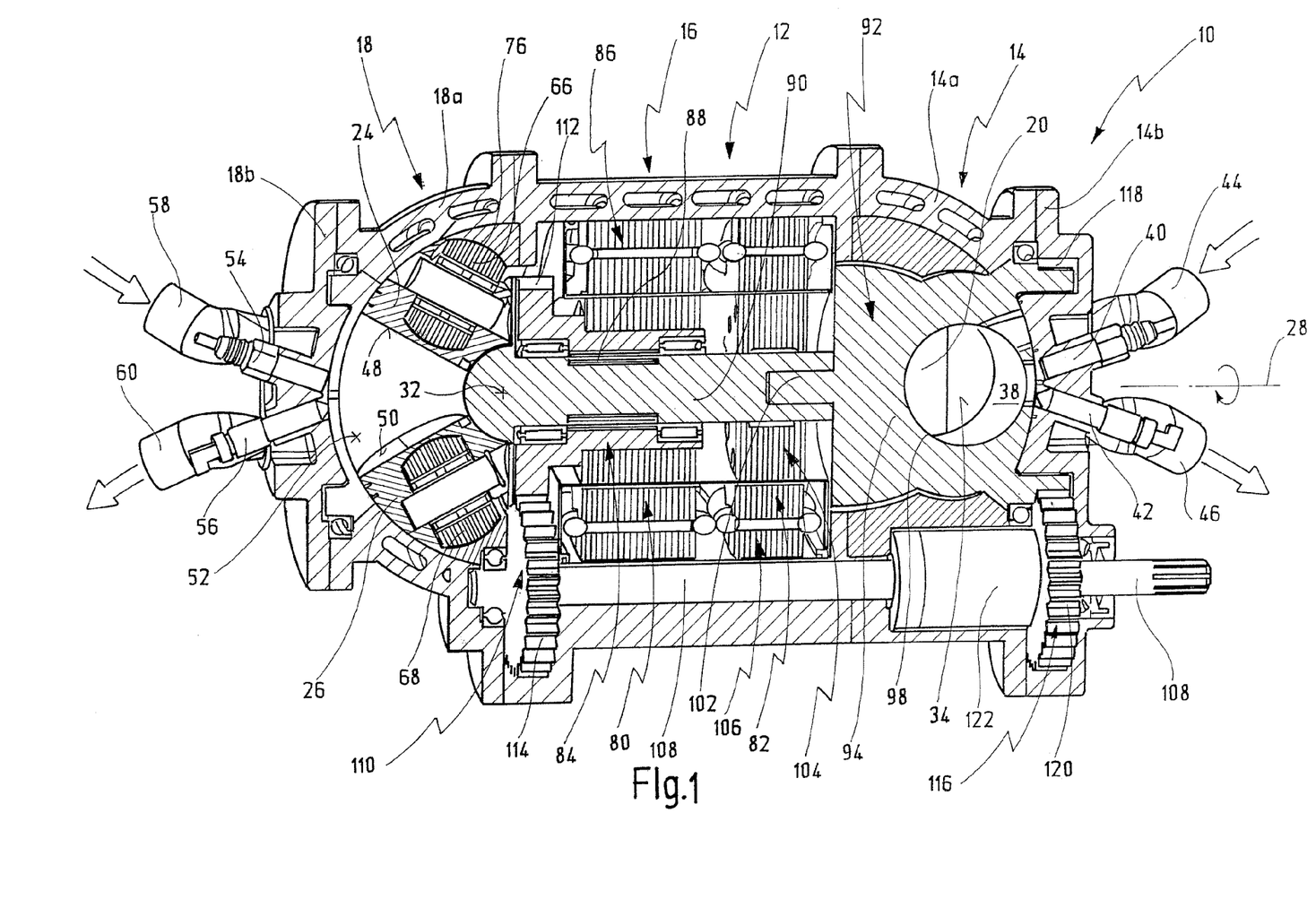
FIG. 1 is a perspective longitudinal section through an oscillating piston engine as a hybrid drive in a plane along the axis of rotation of the rotationally movable parts.
Figure 2:
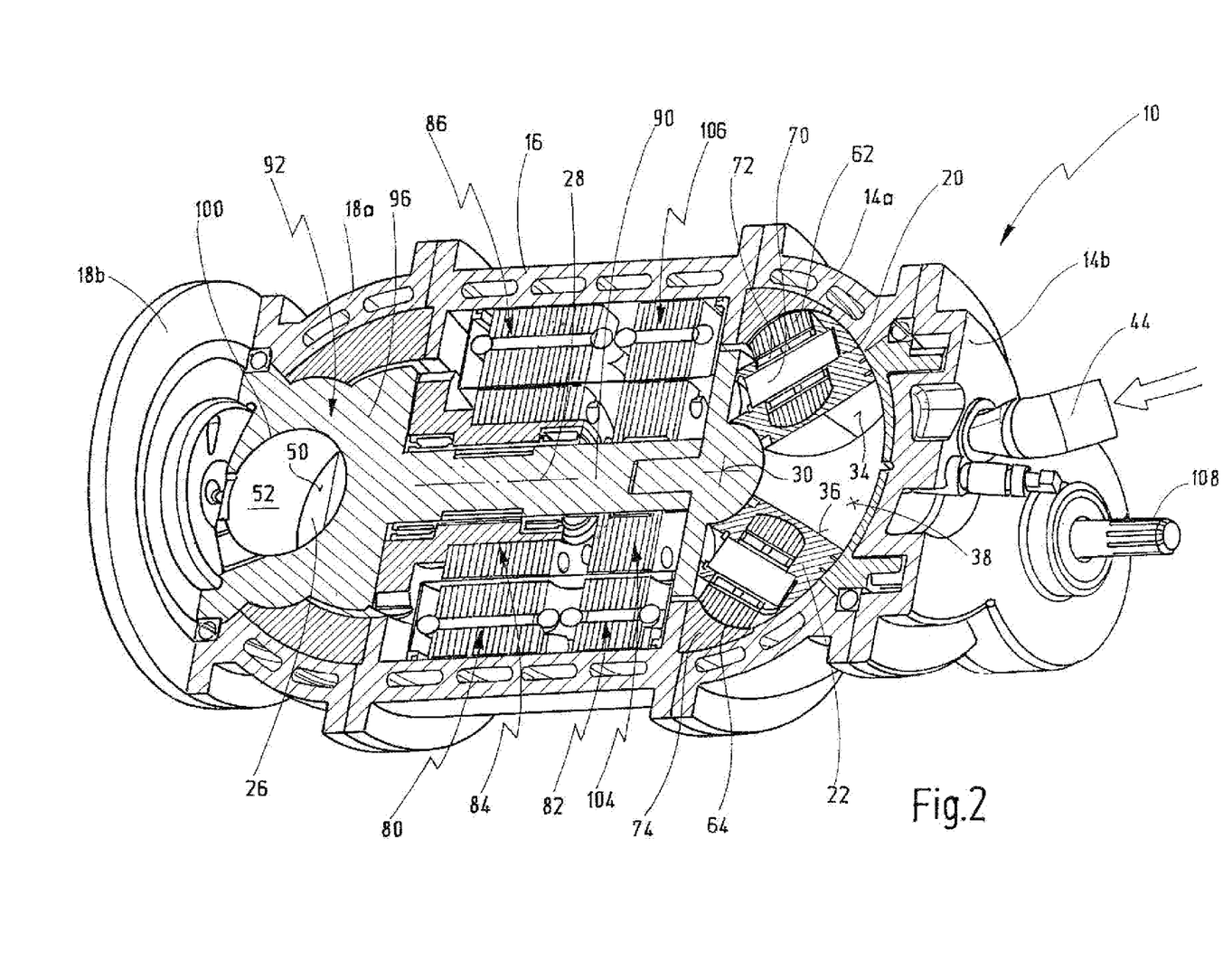
FIG. 2 is a perspective longitudinal section through the oscillating piston engine in FIG. 1 along a plane which is rotated, with respect to the sectional plane in FIG. 1, through approximately 90° about the axis of rotation.

FIGS. 1 and 2 show an oscillating piston engine provided with general reference numeral 10.

The oscillating piston engine 10 is configured as a hybrid drive comprising an internal combustion engine part and an electromotive part.

The oscillating piston engine 10 has a housing 12 which is formed by a first housing part 14, a central second housing part 16 and a third housing part 18. The first housing part 14 is substantially hemispherical in its configuration and has a first housing element 14a and a second housing element 14b, the second housing element being configured as an end-side housing lid. Similarly, the third housing part 18 is formed by a first housing element 18a and a second housing element 18b, the second housing element being configured, in turn, as an end-side housing lid.

The housing parts 14, 16 and 18 are releasably connected to one another, preferably by screws.

The internal combustion engine part of the oscillating piston engine 10 will first be described hereinafter.

The internal combustion engine part of the oscillating piston engine 10 has in total four pistons: a first piston 20, a second piston 22, a third piston 24 and a fourth piston 26. The first piston 20 and the second piston 22 are arranged in the first housing part 14 and the third piston 24 and the fourth piston 26 in the third housing part 18.

The pistons 20 to 26 can revolve in their respective housing part 14 or 18 about a common axis of rotation 28 which is fixed in relation to the housing and is to be understood as a geometric axis. As will be described hereinafter, it is however equally possible for the revolving movement of the pistons 20 and 22 to be uncoupled from the revolving movement of the pistons 24 and 26, i.e. the oscillating piston engine 10 can be operated in such a way that only the pistons 20 and 22 or only the pistons 24 and 26 revolve about the axis of rotation 28, or all four pistons 20 to 26 can revolve simultaneously about the axis of rotation 28.

When revolving about the axis of rotation 28, the pistons 20 and 22 in the housing part 14 perform reciprocating oscillating movements about a first axis of oscillation 30 which is perpendicular to the axis of rotation 28, the oscillating movements of the first piston 20 and the second piston 22 being in opposition to one another.

The third piston 24 and the fourth piston 26 perform in the housing part 18, when revolving about the axis of rotation 28, oscillating movements about a second axis of oscillation 32 which extends perpendicularly to the axis of rotation 28 and also perpendicularly to the first axis of oscillation 30. The oscillating movements of the third piston 24 and the fourth piston 26 about the axis of oscillation 32 are, again, in opposition to one another.

In the exemplary embodiment shown, the pistons 20 and 22 thus perform oscillating movements, the instantaneous direction of oscillation of which lies in a plane perpendicular to the corresponding plane in which the instantaneous direction of oscillation of the third and fourth piston 24, 26 lies. This arrangement, offset through 90°, of the pistons 20 and 22 relative to the pistons 24 and 26 is however not compulsory; on the contrary, all four pistons 20 to 26 can also be arranged in such a way that the axes of oscillation 30 and 32 extend parallel to one another and the instantaneous direction of oscillation of the pistons 20 to 26 lies in all cases in the same plane.

The first piston 20 has a first end face 34 and the second piston 22 a second end face 36 which face one another and together delimit, in the direction of oscillation of the pistons 20 and 22, a first working chamber 38. During the reciprocating oscillating movement of the pistons 20 and 22, the size of the working chamber 38 decreases and increases accordingly. The working chamber 38 serves as a combustion chamber for an air/fuel mixture, the reciprocating oscillating movement of the pistons 20 and 22 causing in the working chamber 38 the strokes of the admission and compression of the air/fuel mixture, the ignition of the compressed air/fuel mixture, the expansion and expulsion of the burnt air/fuel mixture. FIG. 2 shows the working chamber 38 at its maximum volume, i.e. the pistons 20 and 22 are in what is known as the bottom dead centre position (BDC position).

The working chamber 38 is an ignition or glow plug 40 for igniting the air/fuel mixture, an injection nozzle 42 for injecting the fuel, an inlet port 44 for admitting combustion air and an outlet port 46 for expelling the burnt air/fuel mixture. The ignition or glow plug 40, the injection nozzle 42, the inlet port 44 and the outlet port 46 are arranged on the end-side housing lid 14b.

In the exemplary embodiment shown, the end faces 34 and 36 are circular in their configuration and the working chamber 38 has the shape of a pipe bend concentrically with the first axis of oscillation 30.

Accordingly, the third piston 24 has a third end face 48 and the fourth piston 26 a fourth end face 50 which delimit a second working chamber 52 in the direction of oscillation of the pistons 24 and 26. An ignition or glow plug 54, an injection nozzle 56, an inlet port 58 and an outlet port 60, which are arranged on the end-side housing lid 18b, are likewise correspondingly associated with the second working chamber 52. The second working chamber 52, like the working chamber 38, likewise serves as a combustion chamber.

The drawings show the working chamber 52 in its maximum volume, i.e. the pistons 24 and 26 are in their BDC position. This means that the size of the working chambers 28 and 52 increases or decreases in the same direction when the pistons 20 and 22 or 24 and 26 revolve about the axis of rotation 28 and thus perform their oscillating movements. The increasing and decreasing in size of the working chambers 38 and 52 in the same direction is preferred, although a corresponding different arrangement of the pistons 20 to 26 can also provide increasing and decreasing in size of the working chambers 38 and 52 in opposing directions.

The pistons 20 and 22 or 24 and 26 are each arranged in such a way that the working chambers 38 and 52 lie on the axis of rotation 28 or the axis of rotation 28 passes through the working chambers 38 and 52.

A corresponding control mechanism is provided to derive the oscillating movement of the pistons 20 and 22 about the axis of oscillation 30 and of the pistons 24 and 26 about the axis of oscillation 32 from the revolving movement thereof about the axis of rotation 28. For this purpose, the piston 20 has a running member 62, the piston 22 a running member 64, the piston 24 a running member 66 and the piston 26 a running member 68.

As the running members 62 to 68 have the same design as one another, merely the running member 62 will be described hereinafter in greater detail, wherein this description also applies accordingly to the other running members 64 to 68.

The running member 62 is configured as a running roller which is connected, preferably releasably connected, to the piston 20 via a journal 70. The running roller is rotatably mounted on the journal 70 via a precision needle bearing 72.

Instead of the configuration of the running member 62 as a running roller, the running member 62 can also be configured in the form of a solid ball which can be mounted so as to be freely rotatable in a corresponding ball socket on the back of the piston 20.

The running member 62 and the running member 64 run in a control cam which displays an undulatory course with troughs and peaks and which is configured on a cam member 74. A corresponding cam member 76 comprising a control cam is provided for the running members 66 and 68 of the pistons 24 and 26. The cam members and 74 and 76 are arranged on the inside of the housing parts 14 and 18. Instead of additional cam members 74 and 76, the corresponding control cam can also be formed as a groove in the housing parts 14 and 18.

To increase the power of the internal combustion engine part, the rear chambers (not shown) which are remote from the working chamber 38 or 52 can serve as precompression spaces in which the combustion air is precompressed and then introduced into the working chamber 38 or 52 under elevated pressure.

The electromotive part of the oscillating piston engine 10 will now be described in greater detail.

The electromotive part is received in the second housing part 16 which has a substantially cylindrical geometry. The electromotive part directly adjoins the part, formed by the pistons 20 and 22, of the internal combustion engine part of the oscillating piston engine 10 in the direction of the axis of rotation 28, and the further part of the combustion engine part comprising the pistons 24 and 26 then directly adjoins the electromotive part in the housing 16.

The electromotive part has an electric motor/generator 80. The electric motor/generator can, as will be described hereinafter, selectively be operated as an electromotive drive or as an electric generator for generating power.

The electromotive part further has an electric starter/generator 82 which can be operated selectively as a starter for the internal combustion engine part and selectively as a (further) electric generator for generating power.

The electric motor/generator has a rotor 84 and a stator 86. The rotor 84 of the electric motor/generator 80 is connected to a shaft 90 via a free wheel 88, thus allowing the rotor 84 to revolve about the axis of rotation 28 even when the shaft 90 is stationary.

The shaft 90 is part of a piston cage 92 which has on the end side, in addition to the shaft 90, a respective piston receiving element 94 for the pistons 20 and 22 or a piston receiving element 96 for the pistons 24 and 26. The pistons 20, 22 and 24, 26 are rotatably fixedly connected to the shaft 90 via the piston receiving elements 94 and 96. Present in the piston receiving element 94 is a hole 98 in which the pistons 20 and 22 are mounted so as to slide in accordance with the oscillating movements but with corresponding sealing. The hole 98 is configured so as to correspond to the geometric shape of the end faces 34 and 36 in cross section or is circular in its configuration.

A corresponding hole 100 for sliding mounting of the pistons 24 and 26 is present in the piston receiving element 96. The walls of the holes 98 and 100 delimit the working chamber 38 or 52 in the respective circumferential direction thereof. The pistons 20 to 26 are rotatably fixedly connected to the shaft 90 as a result of the pistons 20 and 22 being received in the hole 98 and the pistons 24, 26 in the hole 100.

In the exemplary embodiment shown, the piston cage 92 is, to facilitate assembly, of two-part configuration in that the piston receiving element 94 is connected to the piston receiving element 96 or the shaft 90 via a rotationally fixed plug-type connector 102.

The starter/generator 82 likewise has a rotor 104 and a stator 106, wherein in contrast to the rotor 84 of the electric motor/generator 80 the rotor 104 is preferably rotatably fixedly connected to the shaft 90.

The stators 86 and 106 are fixed to the housing with respect to the central housing part 16.

The oscillating piston engine 10 further has a drive/output shaft 108.

The drive/output shaft 108 is arranged parallel to and set laterally apart from the axis of rotation 28, as may be seen in particular from FIG. 2.

The drive/output shaft 108 is connected to the rotor 84 of the electric motor/generator via a first transmission arrangement 110. For this purpose, the rotor 84 has outer teeth 112 and the drive/output shaft 108 has a gear wheel 114 meshing with the outer teeth 112.

The drive/output shaft 108 is connected to the shaft 90 via a further transmission arrangement 116. For this purpose, the piston receiving element 94, which is connected to the shaft 90, has outer teeth 118 which are in meshing engagement with a gear wheel 120 on the drive/output shaft 108.

The transmission arrangements 110 and 116 can be configured, instead of gear-wheel transmissions, also by belt or chain drives.

The drive/output shaft 108 can however be uncoupled from the shaft 90, so that the rotational movement is not transmitted to the shaft 90 and thus to the pistons 20 to 26 as the drive/output shaft 108 rotates. Provided on the drive/output shaft 108 for this purpose is a clutch 122 which can be switched over between free-running and force-locked connection and is connected to the gear wheel 120. When the clutch 122 is switched to force-locked connection, rotation of the drive/output shaft 108 also leads to rotation of the gear wheel, and thus of the pistons 20 to 26, about the axis of rotation 28.

The functioning of the oscillating piston engine 10 and possible modes of operation thereof will be described hereinafter.

For starting the internal combustion engine part of the oscillating piston engine 10, the starter/generator 82 is activated accordingly. Rotation of the rotor 104 of the starter/generator 82 causes the shaft 90 to rotate about the axis of rotation 28, thus causing via the piston cage 92 the pistons 20 to 26 to revolve about the axis of rotation 28. The working strokes of the combustion engine, namely admission, compression, ignition, expansion and expulsion, then proceed in the working chambers 38 and 52. The oscillating piston engine 10 then operates as an internal combustion engine.

The revolving movement of the pistons 20 to 26 about the axis of rotation 28 is converted via the transmission arrangement 116 into corresponding rotation of the drive/output shaft 108. During this operation, the clutch 122 is switched to force-locked connection and the drive/output shaft 108 drives the rotor 84 of the electric motor/generator 80 via the transmission arrangement 110. The electric motor/generator then operates as a generator for generating power, for example for powering electric units and for charging the vehicle battery, using the oscillating piston engine 10.

The shaft 90 of the rotor 104 of the starter/generator 82 revolves at all times about the axis of rotation 28, so that the starter/generator 82 likewise operates, during operation of the oscillating piston engine 10 as an internal combustion engine, as a generator for generating power.

Furthermore, the oscillating piston engine 10 can also be operated exclusively as an electric drive.

For this purpose, voltage is applied to the electric motor/generator 80, so that the rotor 84 of the electric motor/generator 80 revolves about the axis of rotation 28. As the rotor 84 is rotatably connected to the shaft 90 via the free wheel 88, the rotation of the rotor 84 does not cause the shaft 90 to rotate about the axis of rotation 28. The rotational movement of the rotor 84 about the axis of rotation 28 is transmitted to the drive shaft 108 via the transmission arrangement 110, whereas the clutch 122 is switched to free-wheeling, so that the gear wheel 120 is stationary and generates no revolving movement of the pistons 20 to 26 about the axis of rotation 28.

In the case of the oscillating piston engine 10, provision may additionally be made, in a further mode of operation in which the oscillating piston engine 10 operates as an internal combustion engine, for only the pistons 20 and 22 to revolve about the axis of rotation 28 and generate the drive energy, whereas the pistons 24 and 26 are stationary. This can be achieved by means of a further clutch in the region of the shaft 90, which clutch can for example be opened and closed to interrupt the force-locked connection in the shaft 90. In this way, the oscillating piston engine can selectively be operated as a 2 or 4-piston engine.

What is claimed is:

1. An oscillating piston engine, comprising
an internal combustion engine part having
a first housing part
a first and at least a second piston arranged in at least one first piston cage in said first housing part such that the pistons are able to jointly revolve in said first housing part about an axis of rotation fixed in relation to said first housing part, and further being able, when revolving about said axis of rotation, to perform reciprocating oscillating movements in opposition to one another about an axis of oscillation extending perpendicularly to said axis of rotation,
said first piston having a first end face and said at least second piston having a second end face facing said first end face, said first and second end faces delimiting a working chamber in direction of oscillation of said pistons,
an electromotive part adjoining said internal combustion engine part in direction of said axis of rotation, said electromotive part having
a second housing part adjoining said first housing part of said internal combustion engine part,
at least one rotor arranged in said second housing part concentrically with said axis of rotation;
wherein a drive/output shaft, which is connected to said at least one rotor of said electromotive part via a transmission arrangement, is arranged parallel to and set apart from said axis of rotation.

2. The oscillating piston engine of claim 1, wherein said first housing part of said internal combustion engine part is substantially hemispherical and said second housing part of said electromotive part is substantially cylindrical.

3. The oscillating piston engine of claim 1, wherein said first and at least second pistons are arranged with respect to said axis of rotation in such a way that said axis of rotation extends through said working chamber.

4. The oscillating piston engine of claim 1, wherein a shaft, which is rotatably fixedly connected to said first and at least second pistons and around which said at least one rotor of said electromotive part is arranged, is arranged concentrically with said axis of rotation.

5. The oscillating piston engine of claim 4, wherein said electromotive part has at least one electric motor/generator comprising said at least one rotor, said rotor being connected to said shaft via a free wheel, so that said at least one rotor being adapted to revolve about said axis of rotation even when said shaft is stationary.

6. The oscillating piston engine of claim 1, wherein a shaft, which is rotatably fixedly connected to said first and at least second pistons and around which said at least one rotor of said electromotive part is arranged, is arranged concentrically with said axis of rotation, and wherein said drive/output shaft is operatively connected via a further transmission arrangement to said shaft and via a clutch which is switchable between free-wheeling and force-locked connection.

7. The oscillating piston engine of claim 1, wherein said electromotive part has a starter generator.

8. The oscillating piston engine of claim 7, wherein a shaft, which is rotatably fixedly connected to said first and at least second pistons and around which said at least one rotor of said electromotive part is arranged, is arranged concentrically with said axis of rotation, and wherein a rotor of said starter generator is rotatably fixedly connected to said shaft.

9. The oscillating piston engine of claim 1, wherein said internal combustion engine part has at least a third and a fourth piston adapted to revolve about said axis of rotation and form a second working chamber.

10. The oscillating piston engine of claim 9, wherein said at least third and fourth pistons are arranged in direction of said axis of rotation on a side of said electromotive part that opposes said first and second pistons and are pivotable about a second axis of oscillation.

11. The oscillating piston engine of claim 9, wherein said at least third and fourth pistons are arranged in a hemispherical third housing part.

12. The oscillating piston engine of claim 9, wherein a shaft, which is rotatably fixedly connected to said first and at least second pistons and around which said at least one rotor of said electromotive part is arranged, is arranged concentrically with said axis of rotation, and wherein said first, second, third and fourth pistons are mounted in a piston cage having in a central region said shaft.

13. The oscillating piston engine of claim 12, wherein said shaft has a separable clutch so that, when said clutch is separated, said at least third and fourth pistons do not revolve about said axis of rotation, whereas said first and at least second pistons revolve about said axis of rotation.

14. An oscillating piston engine, comprising
an internal combustion engine part having
a first housing part
a first and at least a second piston arranged in at least one first piston cage in said first housing part such that the pistons are able to jointly revolve in said first housing part about an axis of rotation fixed in relation to said first housing part, and further being able, when revolving about said axis of rotation, to perform reciprocating oscillating movements in opposition to one another about an axis of oscillation extending perpendicularly to said axis of rotation,
said first piston having a first end face and said at least second piston having a second end face facing said first end face, said first and second end faces delimiting a working chamber in direction of oscillation of said pistons,
an electromotive part adjoining said internal combustion engine part in direction of said axis of rotation, said electromotive part having
a second housing part adjoining said first housing part of said internal combustion engine part,
at least one rotor arranged in said second housing part concentrically with said axis of rotation;
wherein said internal combustion engine part has at least a third and a fourth piston adapted to revolve about said axis of rotation and form a second working chamber; and
wherein said at least third and fourth pistons are arranged in direction of said axis of rotation on a side of said electromotive part that opposes said first and second pistons and are pivotable about a second axis of oscillation.

15. The oscillating piston engine of claim 14, wherein said at least third and fourth pistons are arranged in a hemispherical third housing part.

16. The oscillating piston engine of claim 14, wherein a shaft, which is rotatably fixedly connected to said first and at least second pistons and around which said at least one rotor of said electromotive part is arranged, is arranged concentrically with said axis of rotation, and wherein said first, second, third and fourth pistons are mounted in a piston cage having in a central region said shaft.

17. The oscillating piston engine of claim 16, wherein said shaft has a separable clutch so that, when said clutch is separated, said at least third and fourth pistons do not revolve about said axis of rotation, whereas said first and at least second pistons revolve about said axis of rotation.

* * * * *

UNITED STATES PATENT AND TRADEMARK OFFICE
CERTIFICATE OF CORRECTION

PATENT NO. : 7,681,549 B2
APPLICATION NO. : 12/139879
DATED : March 23, 2010
INVENTOR(S) : Herbert Huettlin It is certified that error appears in the above-identified patent and that said Letters Patent is hereby corrected as shown below:

Title Page

Item (30) should read (30) Foreign Application Priority Data

December 16, 2005 (DE) ............................10 2005 062 529

Signed and Sealed this

Twenty-fifth Day of May, 2010

David J. Kappos
*Director of the United States Patent and Trademark Office*